Aug. 13, 1935.  A. F. WILLIAMS  2,011,308

PUPILLARY MEASURING INSTRUMENT

Filed Oct. 30, 1931   2 Sheets-Sheet 1

Inventor
Arthur F. Williams

Attorney

Aug. 13, 1935.                A. F. WILLIAMS                    2,011,308
                       PUPILLARY MEASURING INSTRUMENT
                            Filed Oct. 30, 1931              2 Sheets-Sheet 2

Inventor
Arthur F. Williams
By
Attorney

Patented Aug. 13, 1935

2,011,308

UNITED STATES PATENT OFFICE 2,011,308

PUPILLARY MEASURING INSTRUMENT

Arthur F. Williams, St. Paul, Minn.

Application October 30, 1931, Serial No. 571,986

2 Claims. (Cl. 33—200)

The present invention relates to an optical testing mechanism and more particularly to a mechanism for testing the alinement of the eyes of a patient and their pupillary width.

Various types of mechanisms have been devised for the accomplishment of the above ends, but most of these are not sufficiently accurate for the present-day scientific methods of optometry.

It is necessary, in order to maintain the maximum benefit from glasses, that the focal center of the lens be positioned in direct alinement with the pupillary center of the eye.

An object of the present invention is to make improved and simplified mechanism for determining the exact position of the pupillary center of the eyes of the patient and their positions with respect to the bridge of the nose.

This and other features of the invention will be more fully brought out in the following description and the accompanying drawings, wherein.

Figures 1, 2:
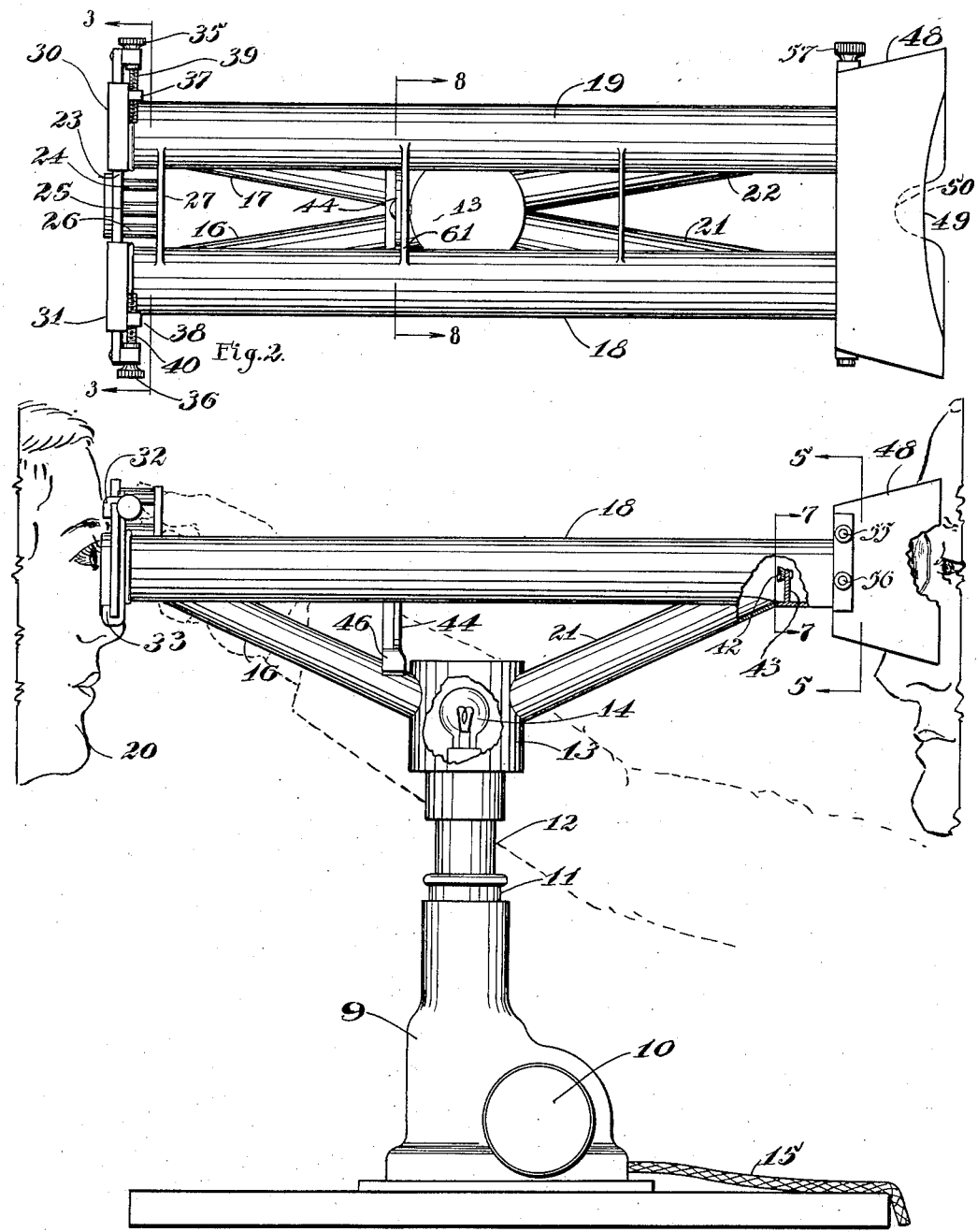
Figure 1 is a view in side elevation of the mechanism embodying the present invention as it would appear in use.
Figure 2 is a plan view of the mechanism shown in Figure 1.

Referring to the drawings in detail, a standard 9 is of a conventional type with an adjusting screw 10 mounted thereon. A pair of telescoping support members 11 and 12 are mounted within the base and are connected to the adjusting screw by a conventional mechanism to regulate the height of the telescoping members 11 and 12 with respect to the base. A compartment 13 is provided at the upper end of the telescoping member 12 to receive an electric lamp 14 which is adapted to be connected to a source of electrical current by means of a conductor 15 carried up through the telescoping member 12 in a well known manner. From the light compartment 13 two diverging tubes 16 and 17 are in open communication with a pair of horizontally disposed parallel tubes 18 and 19 so that the rays of light will pass up through the diverging tubes and illuminate the eyes of a patient 20. Two other similarly diverging tubes 21 and 22 are provided from the compartment 13 to the tubes 18 and 19, and these tubes provide a passage for light rays to illuminate a pair of sighting disks 42 which are mounted on the upper edges of semi-circular partitions 43 in each of the parallel tubes 18 and 19, respectively.

Figure 8:
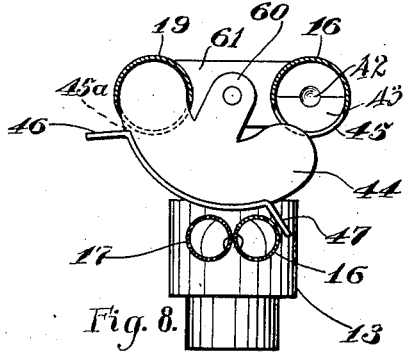
Figure 8 is a sectional view on the line 8—8 of Figure 2.
Figure 7:
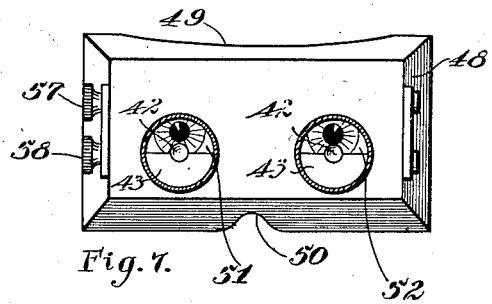
Figure 7 is a sectional view on the line 7—7 of Figure 1.

On the patient's end of the machine, which is the left end, as shown in Figures 1 and 2, a plate 23 rigidly is mounted on three pins 24, 25 and 26 which are rigidly supported on a transverse bracing member 27 connected between the two parallel tubes 18 and 19. The plate 23 is provided with a pair of horizontally slotted openings 28 and 29 and a pair of plates 30 and 31 are slidably mounted on the plate 23 being held in position thereon by means of fingers 32 and 33 which extend over the upper end lower edges of the plate 23 to hold the slidable plates 30 and 31 in position thereon. Each of the slidable plates 30 and 31 is provided with a notched opening 33 having each a fine wire 34 mounted vertically thereof. Thumb screws 35 and 36 are rotatably mounted upon supports 37 and 38 connected to the plate 23 and threadedly engage studs 39 and 40 mounted on the slidable plates 31 and 30, respectively, so that upon turning either the thumb screw 35 or 36 the plate 30 or 31, respectively, will be slightly moved longitudinally of the plate 23. A notch 41 is provided to receive the bridge of the patient's nose. The sighting disks 42 are mounted centrally of the parallel tubes 18 and 19, respectively, on the semi-circular plates 43. The plates 43 prevent the rays of light passing upwardly through the diverging tubes 21 and 22 from striking the eyes of the operator and at the same time permit the operator to look over these plates and into the eyes of the patient. A shutter 44 has a portion 60 thereof pivotally mounted on a transverse support member 61 and having the outer portion thereof curved so that the ends thereof are adapted to enter slotted openings 45 and 45a in the lower portions of the parallel tubes. Operating handles 46 and 47 are provided on this shutter. When the shutter is swung to the left, as shown in Figure 8, it closes the left tube 19 against the passage of light rays, and when swung to the reverse position, it similarly closes the right hand tube 18.

The right hand end of the mechanism, as shown in Figures 1 and 2, is provided with a box-like enclosure 48 open at the outer end and having a curved upper edge portion 49 to receive the forehead of the operator and having a notched portion 50 in the lower edge thereof to receive the nose of said operator. In the inner wall of this box-like enclosure are provided two semi-circular openings 51 and 52 through which the upper portions of the sighting disk is just visible. Two pairs of lenses 53 and 54 are provided upon hinged supports 55 and 56, which are each provided with an operating knob 57 and 58, respectively. One of these pairs of lenses is mounted on its straight edge and is pivoted just below the semi-circular openings, while the other pair of lenses 53 is connected to a supporting rod on their curved edges and the rod upon which they are mounted is pivoted above the upper edge of the semi-circular openings 51 and 52. One pair of these lenses is preferably of one diopter, the other pair of lenses of two diopter, and the combination gives three diopters. Thus, an operator may by turning the knobs 57 and 58 place either or both, or neither of the pairs of lenses in position over the semi-circular opening through which he sees the patient's eyes.

Figure 3:
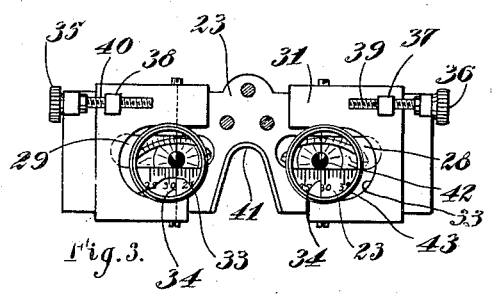
Figure 3 is a sectional view on the line 3—3 of Figure 2.
Figure 4:
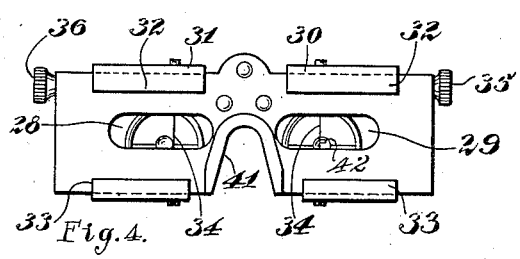
Figure 4 is an end view taken from the left end of the mechanism shown in Figures 1 and 2.
Figure 5:
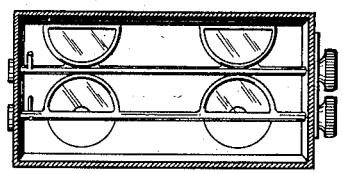
Figure 5 is a sectional view on the line 5—5 of Figure 1, showing one position of a pair of lenses in operative position and another pair in inoperative position.
Figure 6:
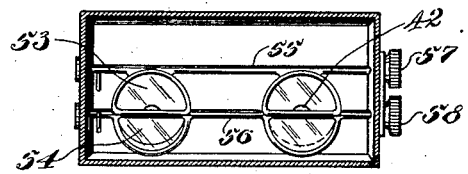
Figure 6 is a view similar to Figure 5 with the position of the lenses reversed.

In using the mechanism a patient is seated before the machine, as shown in Figure 2, and is instructed to place the bridge of the nose in the notched opening 50 so that the eyes are substantially centrally of the tube 18 and 19. The examiner then moves the shutters 44 to close one of the tubes and instructs the patient to look at the center of the sighting disk 52. The operator then sights through the open tube and moves the thumb screw 36 to bring the wire 34 in the center of the patient's pupil. The inner face of the plate 23 toward the operator is marked with measured graduations in either centimeters or hundredths of inches from the center of the notched opening 23. These markings are below the slotted openings 28 and 29 and are clearly visible to the examiner from his end of the mechanism. By reading the figure which coincides with the position of the wire when the hairlines are centered, as shown in Figure 3, by the patient, he reads directly the distance of the center of the pupil of the eye from the center of the bridge of the patient's nose. The shutter 44 is then moved to the opposite position to close the first tube and open the other tube and the process is repeated. This gives a true and direct reading of the exact distances of the centers of the patient's pupils from the center of the bridge of the nose and permits glasses to be manufactured with their focal centers in exact alinement with the focal centers of the patient's eyes.

The mechanism provides an exact and simple mechanism for the accurate determining of the pupillary width of a patient's eyes and also the exact distance of the center of each pupil from the center of the bridge of the nose. As this distance sometimes varies between the two eyes of a patient, the use of the mechanism greatly simplifies the proper fitting of glasses to a patient.

I claim:

1. A pupillary measuring instrument, comprising a pair of parallel elongated chambers having their centers spaced apart by approximately the average pupillary width of a person's eyes, positioning means arranged in connection with said chambers adapted to engage a patient's nose to position the nose centrally between said chambers, means mounted on the opposite end of said chambers from said positioning means to position an operator's eyes in substantial alinement with said chambers, a sighting element adjacent the operator's end in each of said chambers in the line of vision of a patient positioned on the patient's end of said chambers, illuminating means in association with said chambers mounted to illuminate the eyes of a patient, and said sighting element, an indicator in each of said chambers adjustable by said operator into alinement with the pupillary center of a patient's eyes, measuring means associated with said indicator to measure the distance of said indicator from a predetermined fixed point of said instrument, and a pair of correction lenses pivotally mounted adjacent the operator's end in said chambers and adapted to be moved over the operator's end of said chambers.

2. A pupillary measuring instrument, comprising a pair of parallel elongated chambers, positioning means mounted centrally between one end of said chambers adapted to receive the bridge of a patient's nose to position a patient's eyes in alinement with said chambers, a light chamber mounted centrally below said visual chambers, a pair of radiating tubes in open communication with said light chamber and respectively with each of said elongated chambers, illuminating means mounted in said light chamber to have the rays therefrom project upwardly through said tubes into said elongated chambers, a removable partition in each of said elongated chambers adapted to intercept light rays from said radiating tubular members, a sighting element mounted on each of said partitions to be visible to a patient positioned by said positioning means, a gauge mounted horizontally of the end of the chambers adjacent the patient's positioning means, and a pair of indicators movable by an operator into alinement with the pupillary centers of the eyes of a patient positioned in said positioning means, said indicators being in alinement with said gauge and readable directly thereon.

ARTHUR F. WILLIAMS.